United States Patent [19]

Totten

[11] 4,319,645
[45] Mar. 16, 1982

[54] VARIABLE SPEED PLOW WITH MOLDBOARD PIVOTING ABOUT A FORWARD VERTICAL PIVOT AXIS

[75] Inventor: David S. Totten, Greendale, Wis.

[73] Assignee: Allis-Chalmers Corporation, Milwaukee, Wis.

[21] Appl. No.: 217,533

[22] Filed: Dec. 15, 1980

[51] Int. Cl.³ .......................... A01B 3/12; A01B 15/10
[52] U.S. Cl. ..................... 172/664; 172/736; 172/754; 172/742; 172/647
[58] Field of Search ............... 172/735, 736, 754, 742, 172/612, 254, 663, 664, 665, 666, 667, 716, 645, 772, 647

[56] References Cited

U.S. PATENT DOCUMENTS

| 247,110 | 9/1881 | Richard | 172/742 X |
|---|---|---|---|
| 255,898 | 4/1882 | Taylor | 172/736 |
| 2,154,973 | 4/1939 | Chibnik | 172/754 |
| 2,326,097 | 8/1943 | Horner et al. | 172/736 X |
| 2,487,737 | 11/1949 | Skinner | 172/742 X |
| 2,816,498 | 12/1957 | Takakita et al. | 172/664 |
| 4,062,410 | 12/1977 | Moe | 172/742 X |
| 4,141,419 | 2/1979 | Buchele et al. | 172/742 X |

Primary Examiner—George J. Marlo
Attorney, Agent, or Firm—Charles L. Schwab

[57] ABSTRACT

A variable speed plow bottom has a moldboard structure (37) pivotally connected to a fixed portion which includes a frog (14) and a share (17). The pivotable moldboard structure (37) includes an arm (53) whose forward end (52) is pivotally journaled on a vertical axis (49) in a socket (51) in the point (16) of the frog (14) forwardly of the moldboard (18). The moldboard structure (37) is selectively pivotable about the axis (49) by a hydraulic jack (28) between a low speed plowing position (FIG. 2) and a high speed plowing position (FIG. 3).

19 Claims, 8 Drawing Figures

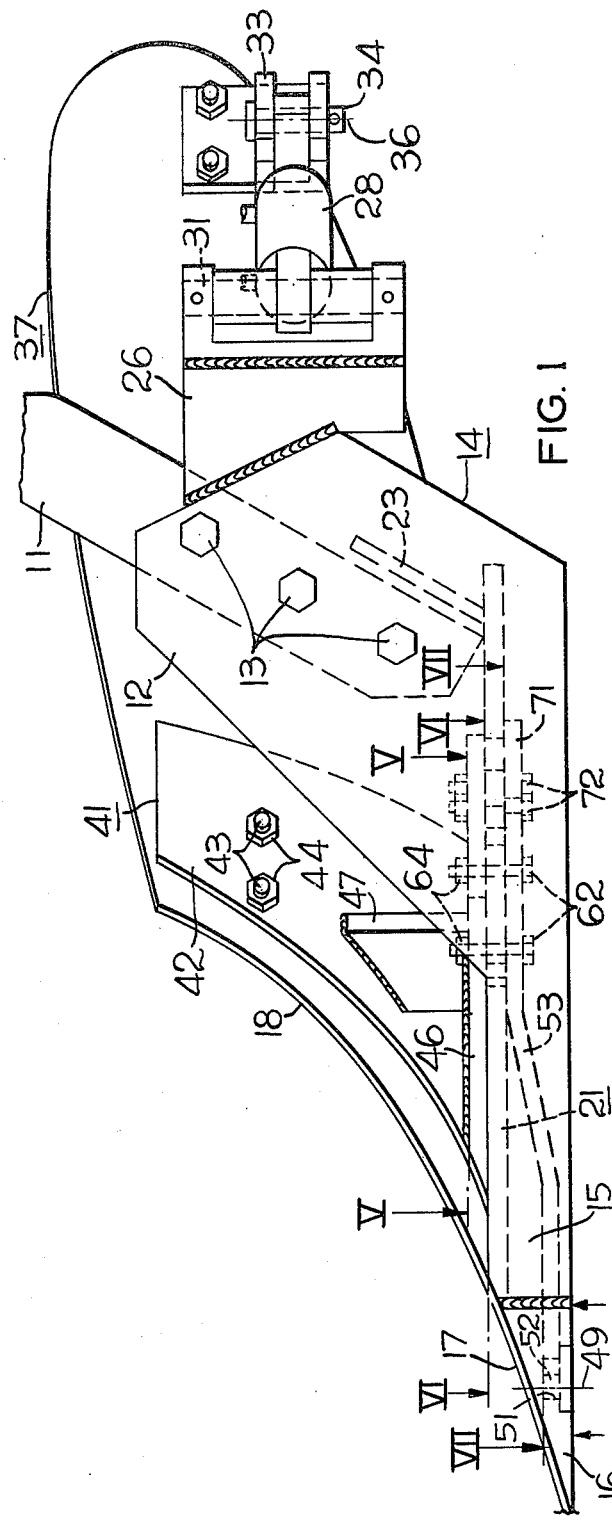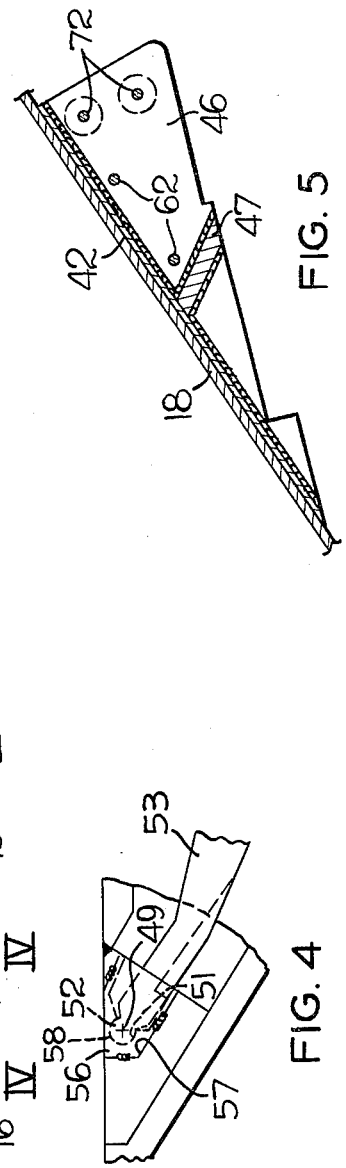

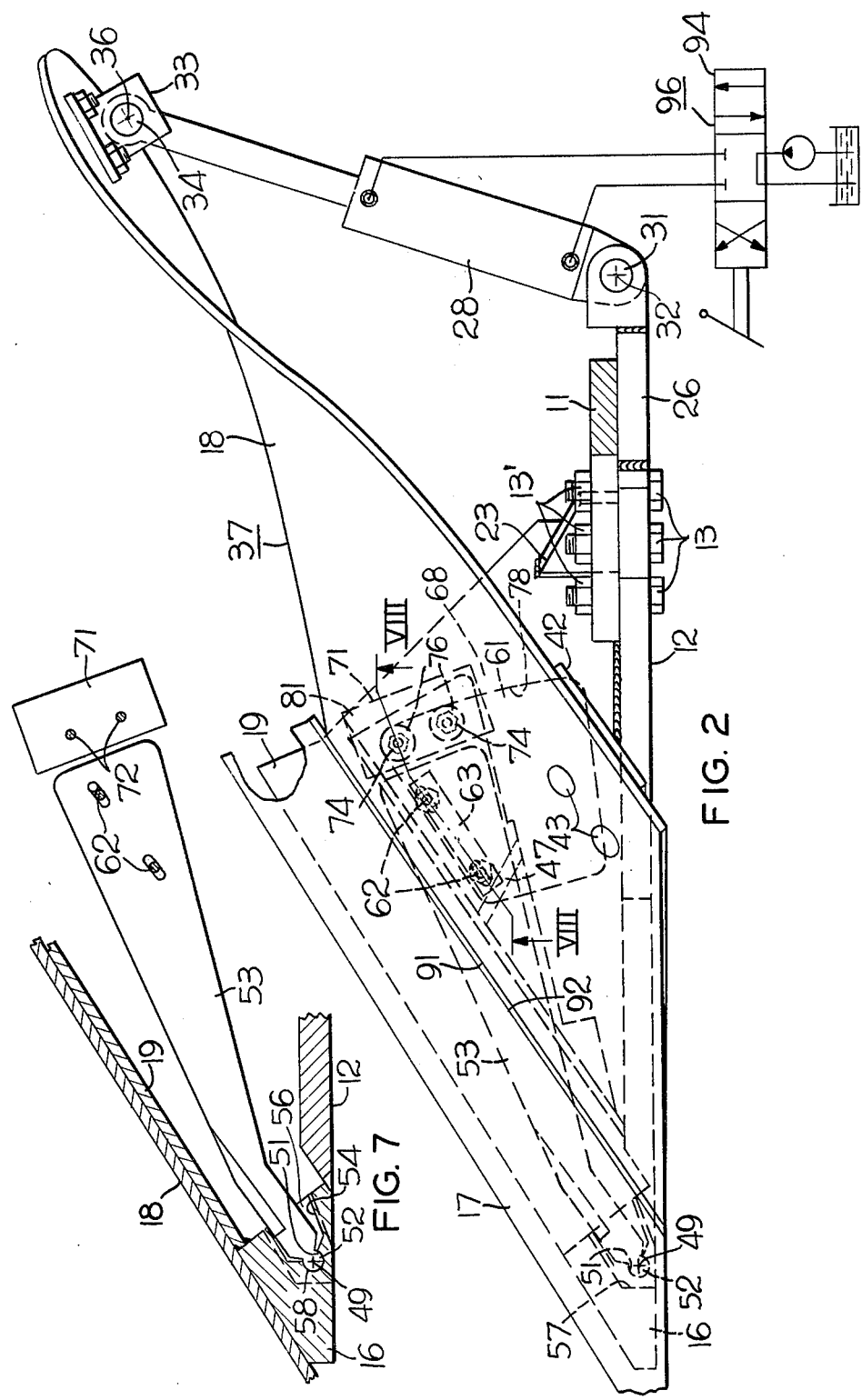

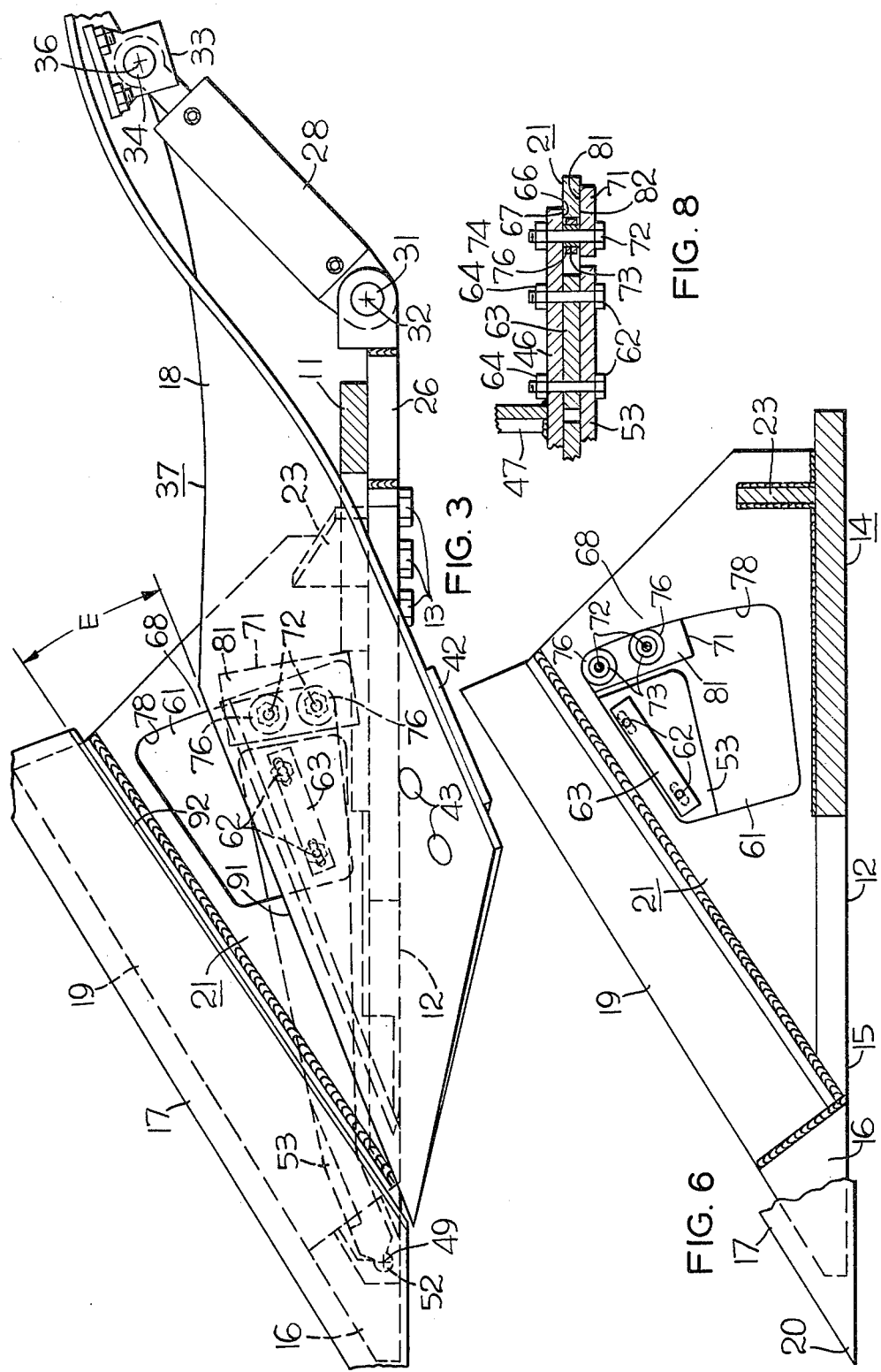

VARIABLE SPEED PLOW WITH MOLDBOARD PIVOTING ABOUT A FORWARD VERTICAL PIVOT AXIS

BACKGROUND OF THE INVENTION

1. Technical Field

This invention relates to moldboard plows and particularly to a moldboard plow suitable for both low and high speed plowing.

2. Prior Art

Heretofore, considerable effort has been expended toward providing a variable speed plow which may be adjusted to permit more effective plowing at different travel speeds. As is well known in the art, when a low speed plow is pulled at high speed, there is a tendency for the plow to throw the ground being plowed an excessive distance. When a plow designed for high speed operation is operated at a slow speed, such as when slowing to make the turn at the end of the land being plowed, the plow may not do a good job of covering crop residue. One attempt to provide a variable speed plow is illustrated in a prior art publication wherein the entire plow bottom is pivoted about a vertical pivot located centrally in relation to the plow bottom. This plow has the disadvantage in that the share of the plow is pivoted, as well as the moldboard, thereby changing the point position and the width of the cut of the share. Another prior art publication shows a construction wherein the entire plow bottom is pivoted about the vertical pivot in response to plowing speed. In this last-mentioned construction, a disadvantage arises in that the land side of the plow is pushed into the sidewall of the furrow thereby increasing the energy required for moving the plow through the ground. In U.S. Pat. Nos. 2,326,097 and 247,110, the rear portion of the moldboard is pivoted about an axis lying substantially in the planes of the respective moldboards. In U.S. Pat. No. 255,898, the upper part of the moldboard is pivotable about a vertical axis near the land side of the plow.

SUMMARY OF THE INVENTION

A plow bottom using the present invention includes a fixed portion and a pivotable portion. The fixed portion is adapted for rigid connection to a plow stub beam and includes a land side and a plow share. The pivotable portion, to which a moldboard is secured, is pivotally connected to the fixed portion near the leading point of plow share for limiting pivoting about a vertical pivot axis to change the throw of the plowed ground. The pivotable portion is guided by a guide member or track on the fixed portion and cooperating guide means on the pivotable portion as the latter swings horizontally through a predetermined angle about its forward pivot axis. A double-acting hydraulic ram may serve as a means for adjusting the angular position of the pivotable portion.

The fixed portion of the moldboard plow of this invention may include a leading point part in which the pivot connection is located below the elevation of the top of the plow share. The pivotable moldboard portion may include a forwardly extending arm whose front end is pivotally connected to the point part. The pivot connection preferably is a disc and socket connection with the disc component being on the pivotable moldboard portion and the socket component being on the point part.

The fixed portion of the moldboard plow may include a horizontal member presenting an opening through which a portion of the pivotable moldboard extends for connection to the arm pivoted to the point part. A substantial part of the ground pressure load on the moldboard may be transmitted to the fixed portion of the plow through a pair of laterally spaced rollers engaging the guide member or track.

BRIEF DESCRIPTION OF THE DRAWINGS

One embodiment of the present invention is illustrated in the drawings in which:

FIG. 1 is a side view of a plow in a low speed plowing position of adjustment;

FIG. 2 is a top view of the plow shown in FIG. 1;

FIG. 3 is a top view of the plow showing the moldboard portion pivoted to a high speed plowing position;

FIG. 4 is a view taken along the line IV—IV in FIG. 1;

FIG. 5 is a view taken along the line V—V in FIG. 1;

FIG. 6 is a section taken along the line VI—VI in FIG. 1;

FIG. 7 is a section taken along the line VII—VII in FIG. 1; and

FIG. 8 is a section taken along the line VIII—VIII in FIG. 2.

DETAILED DESCRIPTION OF THE DRAWINGS

Referring to FIGS. 1 and 2, a stub beam 11 is secured to a main frame, not shown, of a moldboard plow by suitable, releasable, fastening means such as illustrated in the beforementioned U.S. Pat. No. 4,062,410. The stub beam depends downwardly and forwardly and is connected to a vertical, longitudinally extending land side part of a frog 14 in the form of a plate 12 by suitable, releasable, fastening members such as bolts 13 and nuts 13'. The plate 12 of the frog 14 extends downwardly and thence forwardly having its forward end 15 welded to a tetrahedral point part 16. The plate 12 serves as the land side of the plow, that is, it serves to bear against the side of the furrow cut by the share 17 and the moldboard 18. The frog 14 includes a rearwardly diverging share support part in the form of an inclined plate 19 which is welded at its forward end to the point part 16. The laterally, upwardly and rearwardly extending share 17 is releasably secured to the front of the share support plate 19 by share bolts and nuts, not shown, in a conventional manner thus placing the tip 20 of the share in leading position relative to the frog point 16. A horizontal member or plate 21 of the frog 14 is welded to the land side plate 12 and is also welded at its opposite edge to the upper portion of the plow share support plate 19. A transversely extending and generally upright brace or bracket 23 is secured as by welding to the horizontal plate 21 and to the laterally inner side of the vertical plate 12. The frog 14 and share 17 comprise a fixed portion of the plow bottom. A bracket 26 is welded to the rear of the vertical plate 12 of the frog 14 and serves to support a position adjustment means in the form of a double-acting hydraulic jack 28. The cylinder end of the jack 28 is pivotally connected to the bracket 26 by a vertically disposed pivot pin 31 for pivotal movement about the pivot axis 32. The rod end of the jack 28 is pivotally connected to a bracket 33 on the moldboard 18 by a vertical pivot pin 34 for pivoting about a vertical pivot axix 36.

A pivotable moldboard portion or structure 37 includes a moldboard support 41 having a curved moldboard support plate 42 secured to the moldboard 18 by bolts 43 and nuts 44. The moldboard support 41 also includes a horizontal, triangular-shaped plate 46 having an edge welded to the curved moldboard support plate 42 and a vertical brace 47 welded at its upper and lower ends to the plates 42 and 46.

The pivotable moldboard portion 37 of the plow bottom is pivotally connected to the point part 16 of the fixed portion of the plow by a disk and socket joint for horizontal swinging movement about a vertical pivot axis 49 between the slow speed plowing position shown in FIG. 2 and the high speed plowing position shown in FIG. 3. As shown in FIGS. 1, 2, 3, 4 and 7, the pivot between the fixed and pivotable portions of the plow bottom is comprised of a socket defined by a cylindrical surface 51 of a cavity in the point part 16 and a disk 52 on the front end of an arm 53 of the moldboard support 41. As shown in FIG. 7, the socket defined by the radially inward facing cylindrical bearing surface 51 is at the forward end of a larger cavity 54 which is of sufficient width to permit the arm 53 to swing horizontally about the axis 49 through an angle of approximately 12°. The lower end of the cavity 54 is closed off by a plate 56 fitting in a recess 57 and welded at its edges to the point part 16. The disc part 52 of the disc and socket pivot joint presents a radially outward facing cylindrical bearing surface 58 complementary to and in rotatable bearing engagement with the cylindrical bearing surface 51 defining the socket part of the pivot. The cylindrical surface 51 extends circumferentially about 270° and the cylindrical surface 58 extends circumferentially about 282°. The socket is capable of withstanding a certain amount of rearward pull by the arm 53; however, the main portion of the rearward force imposed by the ground slice on the moldboard 18 is carried by, or transferred to, the fixed portion of the plow by bearing means disposed a substantial distance rearwardly of the forward pivot axis 49, which will hereinafter be discussed.

As shown in the drawings, the arm 53 of the pivotable portion 37 of the plow bottom is disposed below the horizontal member 21 of the frog 14. In order to facilitate connection of the arm 53 to the moldboard support structure 41, a vertical opening 61 is formed by cutting a hole in the horizontal member 21. As shown in FIG. 8, the arm 53 has its rear end rigidly, but releasably, secured to the horizontal plate 46 of the pivotable moldboard structure 37 by bolts 62, which pass through sets of aligned vertical openings in the plate 46, a spacer 63 and the arm 53, and by nuts 64. The spacer 63 is disposed within the opening 61 and thus the interconnection between the arm 53 and the plate 46 is effected at the opening 61. This facilitates assembly and disassembly of the arm part 53 from the rest of the pivotable moldboard structure 37. The horizontal plate 46 extends rearwardly above and beyond the opening 61 and presents a downward facing, horizontal bearing surface 66 in vertical thrust transmitting engagement with an upward facing flat bearing surface 67 on a rail portion 68 of the plate 21. A flat horizontally disposed guide part 71 is secured to the plate 46 by a pair of bolts 72, a pair of spacer bushings 73 and nuts 74. The bushings 73 serve as bearings for a pair of rollers 76 whose axes lie in an arc of a circle concentric with the pivot axis 49. The rollers 76 are horizontal thrust transmitting means which transmit rearward thrust from the pivotable moldboard structure 37 to the fixed portion 14 of the plow bottom through rolling engagement at their peripheries with a vertically extending cylindrical bearing surface 78 defining the rear of the opening 61 in the plate 21. The forward facing concave bearing surface 78 on the rail portion 68 of the plate 21 defines a circle concentric with the axis 49 of the pivot connection between the fixed and pivotable portions of the plow bottom. The part 71 presents an upward facing flat bearing surface 81 in confronting relation to a downward facing flat bearing surface 82 on the rail portion 68 of the plate 21. Thus, the pivotable portion 37 of the plow bottom is stabilized against movement about a longitudinal axis by the guide means represented by a first guide member or rail in the form of the arcuate rail portion 68 presenting vertically spaced upward and downward flat bearing surfaces 67 and 82 and a second guide member in the form of the plate 46 and the part 71 presenting vertically spaced downward and upward facing flat bearing surfaces 66 and 81 in vertically confronting relation to bearing surfaces 67, 82, respectively.

OPERATION

When it is desired to adjust the pivotable moldboard structure 37 of the plow bottom from its slow speed plowing position shown in FIG. 2, wherein the lower edge 91 of the moldboard 18 is contiguous to the upper edge 92 of the share 17 to a high speed plowing position such as shown in FIG. 3, the position adjustment means in the form of hydraulic jack 28 is retracted by shifting the plunger 94 of the control valve 96 from its illustrated hold position to the left, as viewed in FIG. 2, to its retract position. Shifting the control valve plunger 94 to the right to its extend position effects extension of the jack 28. The rollers 76 reduce the force required to make the pivotal adjustment of the pivotable moldboard structure 37 and transfer the major portion of the rearward load or thrust imposed on the moldboard by the slice of ground being plowed to the rail or rail portion 68 of the frog 14 of the fixed portion 37 of the plow bottom. This permits the pivot connection between the fixed and pivotable portions of the plow to be small compared to the size the pivot parts would need to be if such pivot parts carried all the rearward horizontal load. Since the pivot parts 51, 52 carry modest loads, they can be small enough to permit placement of the pivot connection in the point 16 of the plow ahead of the moldboard and close to the vertical land side 12. In the illustrated high speed position of the moldboard structure, the latter has been pivoted about vertical axis 49 through an angle E of approximately 12° in which the lower moldboard edge 91 diverges rearwardly from the top share edge 92. It should be understood, of course, that the pivotable moldboard structure 37 can be pivoted to any intermediate position in which the lower moldboard edge 91 lies within the angle E. In all plowing conditions, the cut of the share 17 remains the same and thus, the effective plow width remains the same. By varying the lead angle of the moldboard, the throw of the sliced ground is changed so as to obtain desired trash coverage.

The embodiments of the invention in which an exclusive property or privilege is claimed are defined as follows:

1. A variable speed moldboard plow with a stub beam characterized by
   a plow bottom having a fixed portion rigidly connected to said stub beam, and including
a share extending laterally, upwardly and rearwardly from a forward tip terminating in an upper edge and
a land side
a pivotable moldboard portion including a moldboard with a lower edge
pivot means pivotally connecting said moldboard portion to said fixed portion near said tip for horizontal swinging movement of said moldboard portion between a low speed position in which the lower edge of said moldboard is contiguous to the upper edge of said share and a high speed position in which said lower edge of said moldboard diverges rearwardly of said upper edge of said share, and
means operable to pivotally adjust said moldboard portion relative to said fixed portion.

2. The plow of claim 1 wherein said pivot means includes a first pivot part on said fixed portion disposed beneath the front portion of said share and a second pivot part on said moldboard portion in cooperative pivotal engagement with said first pivot part.

3. The plow of claim 2 wherein said first pivot part includes a socket portion having a radially inward facing cylindrical bearing surface and said second pivot part presents a radially outward facing cylindrical bearing surface in cooperative engagement with said bearing surface on said socket portion.

4. The plow of claim 1 and further comprising cooperative guide means on said fixed and moldboard portions spaced a substantial distance rearwardly of said pivot means operable to guide said moldboard portion relative to said fixed portion through a predetermined horizontal angle.

5. The plow of claim 4 wherein said guide means includes a laterally extending horizontal rail on one of said fixed and moldboard portions.

6. The plow of claim 5 wherein said rail includes parallel, vertically spaced bearing surfaces and said guide means further includes upper and lower horizontal guide surfaces on said other portion in confronting bearing relation to said bearing surfaces.

7. The plow of claim 6 wherein said one portion is said fixed portion.

8. The plow of claim 7 wherein said rail presents a forwardly facing cylindrical bearing surface coaxial with said pivot means and said moldboard portion presents horizontal thrust transmitting means in rearward thrust transmitting engagement with said cylindrical bearing surface.

9. The plow of claim 8 wherein said thrust transmitting means includes a pair of laterally spaced rollers whose outer peripheries are in rolling contact with said cylindrical bearing surface.

10. The plow of claims 4, 5, 6, 7 or 8 wherein said pivot means is disposed at an elevation below said moldboard and the axis of said pivot means is near the front end of said moldboard.

11. The plow of claim 1 wherein said means for pivotally adjusting said moldboard portion includes a double-acting hydraulic jack having one end pivotally connected to said moldboard portion and its other end pivotally connected to said fixed portion.

12. A moldboard plow for variable speed plowing characterized by
a frog having
a longitudinally extending upright part adapted for rigid attachment to a plow frame stub beam
a point part forward of said upright part
an inclined share support part extending laterally and rearwardly of said point part and
a generally horizontal member secured to the top part of said share support part and to said upright part, said horizontal member presenting a horizontal guide member,
a plow share releasably secured to said share support part in leading relation to said point part and share support parts,
a moldboard structure including
a moldboard extending upwardly and rearwardly from said share part, and
a moldboard support including
a moldboard support plate at the rear of and releasably secured to said moldboard,
a longitudinally extending arm pivotally connected at its front end to said point part on a vertical pivot axis and
guide means in cooperative engagement with said horizontal guide member guiding said moldboard structure through a predetermined angle of horizontal swinging movement about said pivot axis, and
position adjustment means on said plow connected to said moldboard structure operable to pivot the latter about its pivot connection with said point part between low and high speed positions of adjustment.

13. The plow of claim 12 and further comprising a forward facing concave cylindrical surface on said horizontal guide member generally concentric with and rearwardly of said vertical pivot axis and thrust means on said moldboard structure including at least one thrust transmitting member in rearward thrust transmitting engagement with said forward facing cylindrical surface.

14. The plow of claim 12 wherein said thrust transmitting member is a roller.

15. The plow of claim 14 wherein said thrust means includes a pair of rollers rotatably supported on vertical axes lying in an arc of a circle whose center is said vertical pivot axis.

16. The plow of claim 12 wherein the forward end of said arm is disposed below said horizontal member of said frog.

17. The plow of claim 16 wherein said horizontal member includes a vertical opening and said horizontal guide member is at the rear of said vertical opening.

18. The plow of claim 17 wherein said arm is connected to said moldboard support plate by means extending through said vertical opening.

19. The plow of claim 18 wherein said horizontal guide member includes upward and downward facing parallel bearing surfaces and said guide means includes vertical thrust transmitting bearing means in sliding engagement with said bearing surfaces.

* * * * *